(12) United States Patent
Nunn

(10) Patent No.: US 10,012,740 B2
(45) Date of Patent: Jul. 3, 2018

(54) REAL TIME NUCLEAR ISOTOPE DETECTION

(71) Applicant: Bracco Diagnostics Inc., Monroe Township, NJ (US)

(72) Inventor: Adrian D. Nunn, Lambertville, NJ (US)

(73) Assignee: Bracco Diagnostics Inc., Monroe Township, NJ (US)

(*) Notice: Subject to any disclaimer, the term of this patent is extended or adjusted under 35 U.S.C. 154(b) by 0 days.

(21) Appl. No.: 15/675,344

(22) Filed: Aug. 11, 2017

(65) Prior Publication Data

US 2017/0363750 A1   Dec. 21, 2017

Related U.S. Application Data

(63) Continuation of application No. 14/657,598, filed on Mar. 13, 2015, now Pat. No. 9,766,351.

(Continued)

(51) Int. Cl.
*G01T 1/161* (2006.01)
*G21F 5/015* (2006.01)
*G21G 4/00* (2006.01)

(52) U.S. Cl.
CPC ................................. *G01T 1/161* (2013.01)

(58) Field of Classification Search
CPC . G01T 1/20; G01T 1/161; A61B 6/037; G21F 5/015; G21G 4/00
See application file for complete search history.

(56) References Cited

U.S. PATENT DOCUMENTS 3,483,867 A   12/1969   Markovitz
3,535,085 A   10/1970   Shumate
(Continued)

FOREIGN PATENT DOCUMENTS

CN   1968653 A   5/2007
EP   102121 A1   3/1984
(Continued)

OTHER PUBLICATIONS

Alvarez-Diez et al. "Manufacture of strontium-82/rubidium-82 generators and quality control of rubidium-82 chloride for myocardial perfusion imaging in patients using positron emission tomography," Applied Radiation and Isotopes, 1999, pp. 1015-1023.

(Continued)

*Primary Examiner* — David Porta
*Assistant Examiner* — Faye Boosalis
(74) *Attorney, Agent, or Firm* — Fredrikson & Byron, P.A.

(57) ABSTRACT

A radioisotope generator that releases a daughter radioisotope from radioactive decay of a corresponding parent isotope, such as a $^{82}$Sr/$^{82}$Rb radioisotope generator or $^{68}$Ge/$^{68}$Ga radioisotope generator, may be used to generate radioisotopes for medical imaging applications. In some examples, a gamma ray detector is positioned to detect gamma rays emanating from radioactive eluate flowing from the generator. Based on the detected gamma rays, an activity of the daughter radioisotope in the eluate and an activity of the parent radioisotope in the eluate may be determined. Depending on the application, the activity of the daughter radioisotope and the activity of the parent radioisotope may be determined in substantially real time, e.g., so that the eluate can be diverted from patient dosing based on determined activity information for the eluate.

10 Claims, 6 Drawing Sheets

Related U.S. Application Data

(60) Provisional application No. 61/952,270, filed on Mar. 13, 2014.

(56) References Cited

U.S. PATENT DOCUMENTS

| | | | |
|---|---|---|---|
| 3,565,376 A | 2/1971 | Viers | |
| 3,710,118 A | 1/1973 | Holgate et al. | |
| 3,714,429 A | 1/1973 | McAfee et al. | |
| 3,774,036 A | 11/1973 | Gerhart | |
| 3,847,138 A | 11/1974 | Gollub | |
| 3,991,960 A | 11/1976 | Tanaka | |
| 3,997,784 A | 12/1976 | Picunko et al. | |
| 4,096,859 A | 6/1978 | Agarwal et al. | |
| 4,160,910 A | 7/1979 | Thornton et al. | |
| 4,212,303 A | 7/1980 | Nolan | |
| 4,286,169 A | 8/1981 | Rossem | |
| 4,336,036 A | 6/1982 | Leeke et al. | |
| 4,466,888 A | 8/1984 | Verkaart | |
| 4,562,829 A | 1/1986 | Bergner | |
| 4,585,009 A | 4/1986 | Barker et al. | |
| 4,585,941 A | 4/1986 | Bergner | |
| 4,623,102 A | 11/1986 | Hough et al. | |
| 4,625,118 A | 11/1986 | Kriwetz et al. | |
| 4,656,697 A | 4/1987 | Naslund | |
| 4,674,403 A | 6/1987 | Bryant et al. | |
| 4,679,142 A | 7/1987 | Lee | |
| 4,755,679 A | 7/1988 | Wong | |
| 4,759,345 A | 7/1988 | Mistry | |
| 4,769,008 A | 9/1988 | Hessel | |
| 4,853,546 A | 8/1989 | Abe et al. | |
| 4,859,431 A | 8/1989 | Ehrhardt | |
| 4,994,056 A | 2/1991 | Ikeda | |
| 5,039,863 A | 8/1991 | Matsuno et al. | |
| 5,254,328 A | 10/1993 | Herscheid | |
| 5,258,906 A | 11/1993 | Kroll et al. | |
| 5,274,239 A | 12/1993 | Lane et al. | |
| 5,395,320 A | 3/1995 | Padda et al. | |
| 5,475,232 A | 12/1995 | Powers et al. | |
| 5,485,831 A | 1/1996 | Holdsworth et al. | |
| 5,590,648 A | 1/1997 | Mitchell et al. | |
| 5,702,115 A | 12/1997 | Pool et al. | |
| 5,739,508 A | 4/1998 | Uber et al. | |
| 5,765,842 A | 6/1998 | Phaneuf | |
| 5,827,429 A | 10/1998 | Ruschke et al. | |
| 5,840,026 A | 11/1998 | Uber, III et al. | |
| 5,885,216 A | 3/1999 | Evans, III et al. | |
| 6,157,036 A | 12/2000 | Whiting et al. | |
| 6,220,554 B1 | 4/2001 | Daoud | |
| 6,267,717 B1 | 7/2001 | Stoll et al. | |
| 6,347,711 B1 | 2/2002 | Goebel et al. | |
| 6,442,418 B1 | 8/2002 | Evans, III et al. | |
| 6,450,936 B1 | 9/2002 | Smith, III et al. | |
| 6,454,460 B1 | 9/2002 | Ramanathan et al. | |
| 6,558,125 B1 | 5/2003 | Futterknecht | |
| 6,626,862 B1 | 9/2003 | Duchon et al. | |
| 6,639,237 B2 | 10/2003 | Pedersen et al. | |
| 6,767,319 B2 | 7/2004 | Reilly et al. | |
| 6,870,175 B2 | 3/2005 | Dell | |
| 6,901,283 B2 | 5/2005 | Evans, III et al. | |
| 6,908,598 B2 | 6/2005 | Sylvester | |
| 7,091,494 B2 | 8/2006 | Weisner et al. | |
| 7,163,031 B2 | 1/2007 | Graves et al. | |
| 7,169,135 B2 | 1/2007 | Duchon et al. | |
| 7,204,797 B2 | 4/2007 | Reilly et al. | |
| 7,256,888 B2 | 8/2007 | Staehr et al. | |
| 7,286,867 B2 | 10/2007 | Schlyer et al. | |
| 7,413,123 B2 | 8/2008 | Ortenzi | |
| 7,476,377 B2 | 1/2009 | Moller et al. | |
| 7,504,646 B2 | 3/2009 | Balestracci et al. | |
| 7,522,952 B2 | 4/2009 | Krieg et al. | |
| 7,586,102 B2 | 9/2009 | Mourtada et al. | |
| 7,605,384 B2 | 10/2009 | Sonnenhol et al. | |
| 7,608,831 B2 | 10/2009 | Lamb et al. | |
| 7,612,999 B2 | 11/2009 | Clark et al. | |
| 7,712,491 B2 | 5/2010 | Tochon-Danguy et al. | |
| 7,734,331 B2 | 6/2010 | Dhawale et al. | |
| 7,737,415 B2 | 6/2010 | Casale et al. | |
| 7,780,352 B2 | 8/2010 | Fox et al. | |
| 7,813,841 B2* | 10/2010 | deKemp | G05B 13/024 |
| | | | 700/282 |
| 7,825,372 B2 | 11/2010 | Allberg | |
| 7,862,534 B2 | 1/2011 | Quirico et al. | |
| 7,996,068 B2 | 8/2011 | Telischak et al. | |
| 8,058,632 B2 | 11/2011 | Balestracci et al. | |
| 8,071,959 B2 | 12/2011 | deKemp | |
| 8,198,599 B2 | 6/2012 | Bouton et al. | |
| 8,216,181 B2 | 7/2012 | Balestracci | |
| 8,216,184 B2 | 7/2012 | Balestracci | |
| 8,295,916 B2 | 10/2012 | Shimchuk et al. | |
| 8,317,674 B2 | 11/2012 | Quirico et al. | |
| 8,431,909 B2 | 4/2013 | Horton et al. | |
| 8,439,815 B2 | 5/2013 | Lemer | |
| 8,442,803 B2 | 5/2013 | Chen et al. | |
| 8,708,352 B2 | 4/2014 | Quirico et al. | |
| 2002/0129471 A1 | 9/2002 | Wang | |
| 2003/0004463 A1 | 1/2003 | Reilly et al. | |
| 2003/0139640 A1 | 7/2003 | Whittacre et al. | |
| 2004/0054319 A1 | 3/2004 | Langley et al. | |
| 2004/0104160 A1 | 6/2004 | Scagliarini et al. | |
| 2004/0260143 A1 | 12/2004 | Reilly et al. | |
| 2005/0187515 A1 | 8/2005 | Varrichio et al. | |
| 2005/0277833 A1 | 12/2005 | Williams | |
| 2005/0278066 A1 | 12/2005 | Graves et al. | |
| 2006/0015056 A1 | 1/2006 | Ellingboe et al. | |
| 2006/0151048 A1 | 7/2006 | Tochon-Danguy | |
| 2006/0173419 A1 | 8/2006 | Malcolm | |
| 2007/0080223 A1 | 4/2007 | Japuntich | |
| 2007/0140958 A1 | 6/2007 | deKemp | |
| 2007/0232980 A1 | 10/2007 | Felt et al. | |
| 2007/0260213 A1 | 11/2007 | Williams et al. | |
| 2007/0282263 A1 | 12/2007 | Kalafut et al. | |
| 2008/0071219 A1 | 3/2008 | Rhinehart et al. | |
| 2008/0093564 A1 | 4/2008 | Tartaglia et al. | |
| 2008/0128626 A1 | 6/2008 | Rousso et al. | |
| 2008/0166292 A1 | 7/2008 | Levin et al. | |
| 2008/0177126 A1 | 7/2008 | Tate et al. | |
| 2008/0191148 A1 | 8/2008 | Gibson | |
| 2008/0237502 A1* | 10/2008 | Fago | G21F 5/018 |
| | | | 250/506.1 |
| 2008/0242915 A1 | 10/2008 | Jackson et al. | |
| 2009/0224171 A1* | 9/2009 | Verbokkem | G21G 4/08 |
| | | | 250/430 |
| 2009/0312630 A1 | 12/2009 | Hidem et al. | |
| 2010/0030009 A1 | 2/2010 | Lemer | |
| 2010/0312039 A1 | 12/2010 | Quirico et al. | |
| 2011/0071392 A1 | 3/2011 | Quirico et al. | |
| 2011/0172524 A1 | 7/2011 | Hidem et al. | |
| 2011/0178359 A1 | 7/2011 | Hirschman et al. | |
| 2011/0209764 A1 | 9/2011 | Uber et al. | |
| 2012/0098671 A1 | 4/2012 | Wieczorek et al. | |
| 2012/0305730 A1 | 12/2012 | Balestracci | |
| 2012/0310031 A1 | 12/2012 | Quirico et al. | |
| 2012/0312980 A1 | 12/2012 | Whitehouse | |
| 2013/0300109 A1 | 11/2013 | Balestracci et al. | |
| 2014/0084187 A1 | 3/2014 | Quirico et al. | |
| 2014/0175959 A1 | 6/2014 | Quirico et al. | |
| 2014/0343418 A1 | 11/2014 | Quirico et al. | |
| 2014/0374614 A1 | 12/2014 | Hidem et al. | |
| 2014/0374615 A1 | 12/2014 | Hidem et al. | |

FOREIGN PATENT DOCUMENTS

| | | | |
|---|---|---|---|
| EP | 310148 | A2 | 4/1989 |
| EP | 319148 | A2 | 7/1989 |
| EP | 160303 | A2 | 2/1991 |
| EP | 919249 | A1 | 6/1999 |
| EP | 1421960 | A1 | 5/2004 |
| EP | 2332593 | A2 | 6/2011 |
| EP | 2011126 | B1 | 5/2012 |
| EP | 2492920 | A2 | 8/2012 |
| FR | 2867084 | A1 | 9/2005 |
| JP | 2000350783 | A | 12/2000 |
| JP | 2006325826 | A | 12/2006 |
| RU | 2131273 | C1 | 6/1999 |

(56) References Cited

FOREIGN PATENT DOCUMENTS

| | | | |
|---|---|---|---|
| RU | 2288755 | C1 | 12/2006 |
| SU | 244513 | A1 | 12/1969 |
| WO | 9615337 | A1 | 5/1996 |
| WO | 9956117 | A1 | 11/1999 |
| WO | 02096335 | A2 | 12/2002 |
| WO | 2004059661 | A1 | 7/2004 |
| WO | 2005002971 | A1 | 1/2005 |
| WO | 2006007750 | A1 | 1/2006 |
| WO | 2006026603 | A2 | 3/2006 |
| WO | 2006074473 | A2 | 7/2006 |
| WO | 2006129301 | A2 | 12/2006 |
| WO | 2006135374 | A2 | 12/2006 |
| WO | 2007016170 | A1 | 2/2007 |
| WO | 2007030249 | A2 | 3/2007 |
| WO | 2007071022 | A1 | 6/2007 |
| WO | 2007096119 | A2 | 8/2007 |
| WO | 2007104133 | A1 | 9/2007 |
| WO | 2007149108 | A2 | 12/2007 |
| WO | 2008028165 | A2 | 3/2008 |
| WO | 2008066586 | A2 | 6/2008 |
| WO | 2008082966 | A2 | 7/2008 |
| WO | 2008140351 | A1 | 11/2008 |
| WO | 2009152320 | A2 | 12/2009 |
| WO | 2010020596 | A1 | 2/2010 |
| WO | 2011126522 | A2 | 10/2011 |
| WO | 2013082699 | A1 | 6/2013 |

OTHER PUBLICATIONS

Brochure, "IV and Liquid Filters: Speedflow Adult 0.2 um Positive", http://www.gvs.it/flex/FixedPages/UK/LiquidFilters.php/L/UK/ID/Speedflow%20Adjust% . . . Retrieved from URL on Nov. 11, 2008.

Bracco Brochure, "Rubidium 82 Infusion System, Easy to Operate . . . Automated . . . Complete", © Bracco Diagnostics, Inc., 0605-002NA, Jun. 2001, (2 pages).

Machine translation of abstract of RU2307378 published Sep. 27, 2007 (Oao Sojurtsvetmetavtomatika).

"CardioGen-82 Infusion System User's Guide," Medical Product Service GmbH, Jul. 3, 2007, 53 pages.

Imaging Technology News, web exclusive: "FDG-PET Injector Thrusts New Life into Molecular Imaging", Apr. 2008, 2 pages.

Neil J. Epstein, "A Rb82 infusion system for quantitative perfusion imaging with 3D PET" Applied Radiation and Isotopes, vol. 60, Feb. 9, 2004, pp. 921-927, XP002557544 DOI:10, 1016/j. apradiso. 2004.02.002.

R. Klein, "Precision controlled elution of a Sr82/Rb82 generator for cardiac perfusion imaging with positron emission tomography" Physics in Medicine and Biology, vol. 52, Jan. 11, 2007, pp. 659-673, XP002557545 DOI:10, 1088/0031-9155/52/3/009.

International Search Report and Written Opinion for International Patent Application No. PCT/US2015/020461, dated Jun. 23, 2015, 13 pages.

Lemer Pax, POSIJET® Integrated FDG dispensing and infusion system, www.lemerpax.com (copyright date May 2008).

R. Klein, "Precise 82RB infusion system for cardiac perfusion measurement using 3D positron emission tomography", Ottawa-Carleton Institute for Electrical and Computer Engineering School of Information Technology and Engineering (Electrical & Computer Engineering), Feb. 2005, 147 pages.

R. Klein, "Precision control of eluted Activity from a Sr/Rb generator for cardiac positron emission tomography", Proceedings of the 26th Annual International Conference of the IEEE EMBS San Francisco, CA, USA, Sep. 1-5, 2004, 4 pages.

\* cited by examiner

REAL TIME NUCLEAR ISOTOPE DETECTION

CROSS-REFERENCE

This application is a continuation of U.S. patent application Ser. No. 14/657,598, filed Mar. 13, 2015, which claims priority to U.S. Provisional Patent Application No. 61/952,270, filed Mar. 13, 2014, the entire contents of which are incorporated herein by reference.

TECHNICAL FIELD

This disclosure relates to nuclear isotopes and, more particularly, to detecting and quantifying nuclear isotopes.

BACKGROUND

Nuclear medicine employs radioactive material for therapy and diagnostic imaging. Positron emission tomography (PET) is one type of diagnostic imaging, which utilizes doses of radiopharmaceutical. The doses of radiopharmaceutical may be injected or infused into a patient prior to or during a PET scan procedure. An infused dose of radiopharmaceutical can be absorbed by cells of a target organ of the patient and emit radiation. A PET scanner can detect the emitted radiation in order to generate an image of an organ. For example, to image body tissue such as the myocardium, a patient may be injected or infused with rubidium-82 (i.e., $^{82}$Rb). Rubidium-82 may exhibit similar physiological uptake as potassium and, accordingly, may be taken into the myocardium following potassium pathways.

Rubidium-82 can be generated for nuclear medicine procedures using a strontium-rubidium generator ($^{82}$Sr/$^{82}$Rb generator). Rubidium-82 is a radioactive decay product of strontium-82. Typically, strontium-rubidium generators contain strontium bound to a generator column through which an eluant is flushed during operation. As strontium-82 decays to rubidium-82, the rubidium-82 may release from the generator column and enter the eluant. The resulting stream, which is called an eluate, can be injected or infused into a patient. Being able to accurately and timely monitor different nuclear isotopes present in the eluate may help ensure the safe and efficacious use of such a radioisotope generator.

SUMMARY

In general, this disclosure is directed to systems and techniques for detecting and quantifying different radioisotopes in a sample under investigation, such as a sample of eluate eluted from a rubidium isotope generator. In some examples, a gamma ray detector is positioned adjacent to a flowing stream of the eluate and used to detect gamma ray emissions emanating from the flowing stream. As the gamma ray detector detects gamma ray emissions, an activity of $^{82}$Rb and/or an activity of $^{82}$Sr in the eluate may be determined in substantially real time. For example, an activity of $^{82}$Sr in eluate passing by the detector may be determined sufficiently quickly such that, if an elevated activity of $^{82}$Sr were detected in the eluate, the eluate can be diverted to a waste bottle without being injected into a patient.

In some examples, the activity of $^{82}$Rb and the activity of $^{82}$Sr are determined by resolving overlapping gamma ray spectra emitted by two isotopes. For example, $^{82}$Rb is known to emit gamma rays in the energy range of 511 keV (kilo electron volts) and 776 keV. $^{85}$Sr is known to emit gamma rays in the energy range of 514 keV and is related to $^{82}$Sr through an isotope ratio. Given the practical resolution limits of most gamma ray detectors, gamma rays emitted in the 511 keV to 514 keV energy range cannot be clearly attributed to either $^{82}$Rb or $_{85}$Sr. However, in accordance with some examples of the present disclosure, gamma rays emitted by $^{82}$Rb in the 511 keV range can be resolved from gamma rays emitted by $^{85}$Sr in the 514 keV range to rapidly determine the amount of $^{82}$Rb and $^{82}$Sr in a sample.

While the disclosed systems and techniques have good applicability to $^{82}$Sr/$^{82}$Rb generators, the systems and techniques are not limited to being implemented on such generators. Rather, the disclosed systems and techniques can be used to detect and quantify any desired radioisotope eluted from a radioisotope generator that releases a daughter radioisotope from radioactive decay of a corresponding parent isotope. In some configurations, a gamma ray detector is positioned downstream from the radioisotope generator, for example adjacent to a flowing stream of eluate, and used to detect gamma ray emissions emanating from the eluate. As the gamma ray detector detects gamma ray emissions, an activity of the daughter radioisotope, the parent radioisotope, and/or another radioisotope in the eluate may be determined.

In practice, a parent radioisotope present in eluate flowing from the radioisotope generator past the gamma detector may have a sufficiently small activity and/or lack gamma emissions such that it is difficult to resolve the parent radioisotope from the daughter radioisotope. To help resolve the radioisotopes in these situations, the daughter radioisotope may be separated from the parent radioisotope before measuring the gamma spectrum emitted by the eluate. In one example, the eluate is passed across an accumulator structure configured to preferentially bind the parent radioisotope while allowing the daughter radioisotope to flow past the structure. For example, a secondary generator column formed of the same or similar material to the column used in the radioisotope generator can be positioned downstream of the radioisotope generator. Unlike the radioisotope generator column which is loaded with the parent radioisotope, however, the second generator column may be substantially or entirely devoid of the parent radioisotope (although parent radioisotope may accumulate on the second generator column over time). The gamma detector can be positioned to measure gamma emissions emanating from the second generator column, such as liquid in the second generator column and/or flowing through the generator column.

When configured with an accumulator structure, eluate discharged from the radioisotope generator may initially flow across the structure. Parent radioisotope can accumulate (e.g., bind) on the accumulator structure from the eluate as the eluate is flowing across the structure. During this process, gamma radiation emitted by the eluate can be measured by the gamma detector. Since the activity of daughter radioisotope is typically expected to be significantly greater than the activity of any parent radioisotope present, the gamma radiation measured by the gamma detector can be attributed to the daughter radioisotope and the activity of the daughter radioisotope determined therefrom. After terminating elution from the radioisotope generator, the accumulator structure can be flushed with eluant to remove residual eluate/daughter radioisotope from the accumulator structure. Subsequently, gamma radiation emitted from the accumulator structure and/or eluant in or flowing across the accumulator structure can be measured by the gamma detector. Since the activity of parent radioisotope (or decay products thereof) is typically expected to be greater than the activity of any residual daughter radioisotope present, the gamma radiation measured by the gamma detector can be attributed to the parent radioisotope and the activity of the parent radioisotope determined therefrom.

In one example, an elution system is described that includes a $^{82}$Sr/$^{82}$Rb generator configured to generate $^{82}$Rb via elution with an eluant, an eluant line configured to supply the eluant to the $^{82}$Sr/$^{82}$Rb generator, an eluate line configured to receive eluate eluted from the $^{82}$Sr/$^{82}$Rb generator and convey the eluate to one of a patient line and a waste line, and a gamma ray detector positioned adjacent to the eluate line and configured to detect gamma rays emitted from eluate flowing through the eluate line. The example system also includes a controller communicatively coupled to the gamma ray detector and configured to receive data indicative of the gamma radiation emitted by the eluate flowing through the eluate line, determine an activity of $^{82}$Rb in the eluate based on the received data, and determine an activity of $^{82}$Sr and/or $^{85}$Sr based on the received data.

In another example, a method is described that includes receiving data indicative of nuclear radiation emitted by an eluate eluted from a rubidium isotope generator, determining an activity of $^{82}$Rb in the eluate based on the received data in substantially real time with receipt of the data, and determine an activity of $^{82}$Sr and/or $^{85}$Sr in the eluate based on the received data in substantially real time with receipt of the data.

In another example, a calibration method is described that includes detecting gamma radiation via a gamma ray detector from a first isotope having a known activity and emitting in a region of a 776 keV line of a gamma ray spectrum and determining an efficiency factor for the 776 keV line by dividing a detected activity of the first isotope in the region of the 776 keV line by the known activity for the first isotope. The example method also includes detecting gamma radiation via the gamma ray detector from a second isotope having a known activity and emitting in a region of a 511 keV line and a 514 keV line of the gamma ray spectrum and determining an efficiency factor for the 511 keV line and the 514 keV line of the gamma ray spectrum by dividing a detected activity of the second isotope in the region of the 511 keV line and the 514 keV line by the known activity for the second isotope. The example also includes storing the determined efficiency factor for the 776 keV line and the determined efficiency factor for the 511 keV line and the 514 keV in a memory associated with the gamma ray detector.

In another example, an elution system is described that includes a radioisotope generator, an eluant line, an eluate, line, a gamma ray detector, and a controller. The radioisotope generator is configured to release a daughter radioisotope during elution with an eluant thereby producing an eluate containing the daughter radioisotope, the daughter radioisotope being produced from radioactive decay of a parent radioisotope contained within the radioisotope generator. The eluant line is configured to supply the eluant to the radioisotope generator. The eluate line is configured to receive and convey eluate eluted from the radioisotope generator. The gamma ray detector is positioned to detect gamma rays emitted from radioisotopes released by the radioisotope generator, and decay products thereof, and conveyed from the radioisotope generator via the eluate line. The controller is communicatively coupled to the gamma ray detector and configured to receive data indicative of the gamma radiation emitted by the radioisotopes released by the radioisotope generator and the decay products thereof.

The controller is further configured to determine an activity of the daughter radioisotope in the eluate based on the received data and determine an activity of the parent radioisotope in the eluate based on the received data.

The details of one or more examples are set forth in the accompanying drawings and the description below. Other features, objects, and advantages will be apparent from the description and drawings, and from the claims.

DETAILED DESCRIPTION

Figure 1:
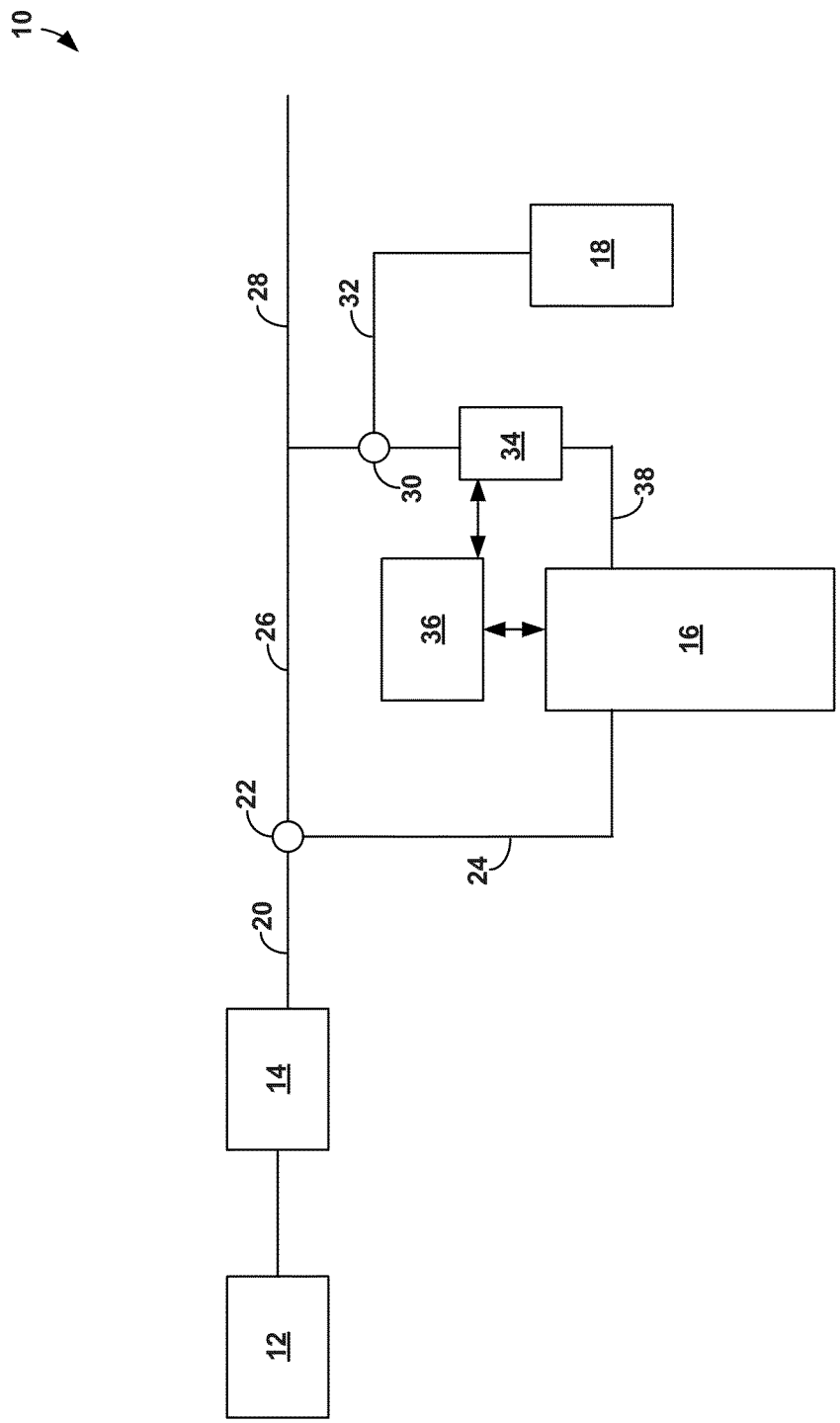
FIG. 1 is a block diagram of an example radioisotope generator system that may generate radioisotopes.

In general, the disclosure relates to real time detection and quantification of different radioisotopes in a sample. The described systems and techniques can be implemented to detect and quantify any desired radioisotope eluted from a radioisotope generator that releases a daughter radioisotope produced via radioactive decay of a corresponding parent isotope. For example, in different applications, a radioisotope generator can produce a positron emitter, a photo emitter, or a particle emitter for therapy. The parent radioisotope is typically bound to a generator column through which an eluant is flushed during operation. As the parent radioisotope decays, one or more daughter radioisotopes are produced that bind to the generator column less strongly than the parent radioisotope. As a result, the daughter radioisotope may be released into the eluant flowing through the generator, thereby producing an eluate containing the daughter radioisotope.

Being able to accurately and timely monitor different nuclear isotopes present in the eluate may help ensure the safe and efficacious use of the radioisotope generator. In accordance with the techniques described in some examples herein, the eluate produced by the radioisotope generator is monitored in real time to determine the activity of the daughter radioisotope present in the eluate, the activity of the parent radioisotope present in the eluate, and/or the activity of one or more other radioisotopes of interest. In one application, for instance, a radioisotope generator system includes a gamma detector positioned downstream of a radioisotope generator. The gamma detector may be positioned to receive gamma radiation emanating from a flow pathway through which eluate flows during operation. The gamma detector can measure the gamma radiation from the eluate pathway. The activity of one or more radioisotopes present in the eluate produced by the radioisotope generator can be quantified based on the magnitude and characteristics (e.g., energy line, decay rate) of the gamma radiation detected by the gamma detector. In some configurations, the radioisotope generator system is actively controlled in real time based on the types and/or quantities of radioisotopes detected by the radioisotope generator system. For example, the radioisotope generator system may automatically prohibit or allow a patient infusion procedure, as the case may be, based on the types and/or quantities of radioisotopes detected as being present in the eluate produced by the system.

While examples of the disclosure describe real time detection and quantification of different radioisotopes, the actual time scale for detection and quantification can vary in practice. For example, as described in greater detail below, radioisotope generator systems according to the disclosure can be implemented using a variety of different gamma detectors, including liquid cooled gamma detectors, room temperature gamma detectors, solid state gamma detectors, and the like. The resolution of the gamma spectrum generated by a gamma detector can vary depending on the type of gamma detector selected for a system and the configuration of hardware and/or software selected to implement the gamma detector. Accordingly, the precision and speed of radioisotope measurements made can vary in practice depending on the configuration of the radioisotope generator system and the practical design choices necessary to implement the system taking into account factors such as the operating environment of the system, cost of implementation, and sophistication of the operating personal.

Notwithstanding the optional design choices that can be made when implementing the systems and techniques described herein, in some example, a system is implemented using a rubidium generator. In operation, a sample containing one or more radioisotopes is generated via elution with a rubidium generator. For example, when an eluant is passed through a $^{82}Sr/^{82}Rb$ generator, rubidium-82 generated as a radioactive decay product from strontium-82 may elute into the eluant, generating a radioactive eluate. The eluate may contain isotopes besides rubidium-82, with the number and magnitude of the isotopes varying, e.g., based on the operation performance of the generator. For example, as the generator is used to generate doses of rubidium-82, strontium-82 and/or strontium-85 may release from the generator and also enter the eluate. As another example, cesium-131 may enter the eluate in trace amounts as a contaminant. Accordingly the total amount of radioactivity measured from the eluate may not to be attributable to any one particular isotope but may instead be the sum amount of radioactivity emitted each of the different isotopes in the eluate.

In accordance with some examples of the present disclosure, a technique is described that can be used to resolve measured radioactivity from an eluate sample so as to determine the amount of measured radioactivity attributable to each of a plurality of different isotopes in the sample. For example, the technique may be used to quantify the amount of activity attributable to rubidium-82 in the eluate and the amount of activity of strontium-82 in the eluate, e.g., so as to determine a concentration of the rubidium-82 and strontium-82. The quantification of the different activities may be made in substantially real time by measuring the total radioactivity of the eluate, e.g., so that patient dosing and/or radioisotope generator operation can be adjusted in substantially real time. For example, the quantification of the different activities may be made without having to wait for one of the isotopes in the eluate (e.g., rubidium-82) to fully decay to distinguish the amount of activities provided by each of a plurality of different isotopes in the eluate.

In one example, the technique involves generating a gamma ray spectrum from gamma rays emitted by an eluate sample and determining an amount of activity associated with different portions of the spectrum. For example, rubidium-82 emits radioactive rays at the 511 keV line in the gamma ray spectrum and the 776 keV line of the spectrum. Accordingly, by measuring the amount of radioactivity emitted at the 511 keV line and the 776 keV line in the spectrum, it can be assumed that the activity at the two lines is attributable to rubidium-82 and the total activity of rubidium-82 determined. However, when strontium-85 is also present, gamma rays emitted by strontium-85 can interfere with accurate determination of rubidium-82. Strontium-85 emits radioactive rays at the 514 keV line in the gamma ray spectrum, which is adjacent the 511 keV line of rubidium-82. In practice, most gamma ray detectors cannot provide enough resolution to distinguish between activity emitted at the 511 keV line from the 514 keV line of the spectrum, preventing the amount of activity of rubium-82 at the 511 keV line from being distinguished from the amount of activity of strontium-85 at the 514 keV line.

To overcome the activity interference in the 511-514 keV region of the spectrum, the technique may first determine the activity of rubidium-82 at the 776 keV line of the spectrum and then use this activity to determine the corresponding activity of rubidium-82 at the 511 keV line. For example, the technique may determine the activity of rubidium-82 at the 776 keV line of the spectrum and then multiply this activity by a branching intensity factor to determine the activity at the 511 keV line. The branching intensity factor may be a factor that relates the activity of rubidium-82 at the 776 keV line to the activity of the isotope at the 511 keV line based on known nuclear properties of rubidium-82. The total activity of rubidium-82 can then be determined by summing the determined activity for the 776 keV line with the determined activity for the 511 keV line. Further, with knowledge of the activity of rubidium-82 at the 511 keV line, this activity can be subtracted from the combined activity of rubidium and strontium measured in the 511-514 keV region of the gamma ray spectrum to identify the activity of strontium-85. The activity of strontium-82 can further be identified using the activity of strontium-85 and a ratio relating the activity of strontium-85 to the activity of strontium-82. In this manner, the activity of rubidium-82, strontium-85, and/or strontium-82 can be determined in a sample under investigation.

The respective activities of rubidium-82, strontium-85, and/or strontium-82 can be determined as rapidly as an electronic processing device performing the calculations can receive gamma ray measurement data and process the data. In practice, the activities may be determined in substantially real time, e.g., such that the activities of rubidium-82 and strontium-82 can be determined substantially simultaneously with measuring total gamma ray emissions emitted by a sample under investigation (e.g., less than 30 seconds after detecting and measuring the total emissions, such less than 10 seconds, less than 5 seconds, less than 2 seconds, or less than 1 second).

To help ensure that the activities at different lines of a gamma ray spectrum can be accurately distinguished and determined, a gamma ray detector may be calibrated prior to use. For example, the gamma ray detector may be calibrated to generate calibration factors, which may be referred to as efficiency factors, that are then stored in a memory associated with the gamma ray detector. The efficiency factors may or may not be generated prior to installation of the gamma ray detector in a radioisotope generator system containing a generator that generates radioisotopes via elution. In operation, different efficiency factors may be applied to activity measurements made at different lines in the gamma ray spectrum so as to generate adjusted activity measurement data.

In one example, a calibration technique involves measuring gamma radiation from a first isotope emitting at or around the 776 keV line (e.g., within a range of plus or minus 5 keV) of the gamma ray spectrum and having a known activity. The activity measured by the gamma ray detector at or around the 776 keV line may be divided by the known activity of the isotope to generate a first efficiency factor. The first efficiency factor may then be applied to subsequent activity measurements made by the gamma ray detector at the 776 keV line to generate adjusted activity measurements for the line.

In some additional examples, the gamma ray detector is used to measure gamma radiation from a second isotope emitting in the region of the 511 to 514 keV lines of the gamma ray spectrum and having a known activity. The activity measured by the gamma ray detector at or around the 511 to 514 keV lines (e.g., within a range of plus or minus 5 keV) may be divided by the known activity of the isotope to generate a second efficiency factor. The second efficiency factor may then be applied to subsequent activity measurements made by the gamma ray detector at the 511 to 514 keV lines to generate adjusted activity measurements for the lines.

Independent of whether efficiency factors are determined for a gamma ray detector or applied to gamma ray detector activity measurements during operation, activity measurements made for different radioisotope species can be stored and/or used for a variety of purposes in a radioisotope generator system. In some applications, the gamma ray detector may be installed at the same physical location as a $^{82}Sr/^{82}Rb$ generator, e.g., as part of an electronically integrated system that receives measurements from the gamma ray detector and also controls operation of the $^{82}Sr/^{82}Rb$ generator. For example, the gamma ray detector can be positioned to detect gamma radiation emanating from a flowing stream of eluate discharging from the $^{82}Sr/^{82}Rb$ generator. Additionally or alternatively, a sample of eluate generated from the $^{82}Sr/^{82}Rb$ generator may be stopped in front of the gamma ray detector for a period of time (e.g., to perform periodic linearity/constancy checks on measurements made by the gamma ray detector). In either application, data generated by the gamma ray detector may be stored in a memory associated with the $^{82}Sr/^{82}Rb$ generator and/or electronically transmitted to an offsite location, e.g., for monitoring and/or evaluating the operation of the $^{82}Sr/^{82}Rb$ generator. In additional examples, a controller operatively coupled to a $^{82}Sr/^{82}Rb$ generator system may control operation of the system based on data generated by the gamma ray detector. For example, the controller may compare the activity of one or more individual isotopes to one or more thresholds stored in memory and control operation of the system based on the comparison. In different examples, the controller may initiate a user alert (e.g., a visual, textual, audible user alert), shut down an eluant pump so as to cease generating eluate, and/or control a diverter valve to divert elute from a patient line to a waste line connected to a waste bottle or vice versa in response to determining that a measured activity for an isotope has exceeded a threshold.

FIG. 1 is a block diagram illustrating an example radioisotope generator system 10 in which different radioisotopes may be detected and quantified using systems and methods in accordance with the disclosure. Radioisotope generator system 10 includes an eluant reservoir 12, an eluant pump 14, a radioisotope generator 16, and a waste bottle 18. Eluant pump 14 receives eluant from eluant reservoir 12, pressurizes the eluant, and discharges pressurized eluant into an eluant line 20. A first diverter valve 22 controls the flow of eluant to one of a radioisotope generator inlet line 24 and a radioisotope generator bypass line 26. Eluant flowing through radioisotope generator bypass line 26 bypasses radioisotope generator 16 and can flow directly into a patient line 28, which may be connected to a patient. A second diverter valve 30 controls a flow of eluate generated by elution within radioisotope generator 16 to one of the patient line 28 or a waste line 32. Waste line 32 is connected to waste bottle 18.

During operation, radioisotope generator 16 can generate radioisotopes via elution. For example, radioisotope generator 16 may be a $^{82}Sr/^{82}Rb$ generator containing strontium-82 bound on a support material, such as stannic oxide or tin oxide. Rubidium-82 is a daughter decay product of strontium-82 and binds less strongly to the support material than the strontium. As pressurized eluant from eluant reservoir 12 is passed through the radioisotope generator, the eluant may release rubidium-82 so as to generate an eluate. For example, when the eluant is a saline (NaCl) solution, sodium ions in the saline can displace rubidium in the generator so as to elute a rubidium-82 chloride solution.

In other examples, radioisotope generator 16 can generate different types of daughter decay products besides rubidium-82. The type of daughter decay product produced by radioisotope generator 16 can be controlled by selecting the type of parent radioisotope loaded onto the generator support material. Example types of radioisotope generators that can be used as radioisotope generator 16 include, but are not limited to, $^{99}Mo/^{99m}Tc$ (parent molybdenum-99 bound on a support material to produce daughter decay product technetium-99m); $^{90}Sr/^{90}Y$ (parent strontium-90 bound on a support material to produce daughter decay product yttrium-90); $^{188}W/^{188}Re$ (parent tungsten-188 bound on a support material to produce daughter decay product rhenium-188); and $^{68}Ge/^{68}Ga$ (parent germanium-68 bound on a support material to produce daughter decay product gallium-90). Yet other types of radioisotope generators that can be used as radioisotope generator 16 include: $^{42}Ar/^{42}K$; $^{44}Ti/^{44}Sc$; $^{52}Fe/^{52m}Mn$; $^{72}Se/^{72}As$; $^{83}Rb/^{83m}Kr$; $^{103}Pd/^{103m}Rh$; $^{109}Cd/^{109m}Ag$; $^{113}Sn/^{113m}In$; $^{118}Te/^{118}Sb$; $^{132}Te/^{132}I$; $^{137}Cs/^{137m}Ba$; $^{140}Ba/^{140}La$; $^{134}Ce/^{134}La$; $^{144}Ce/^{144}Pr$; $^{140}Nd/^{140}Pr$; $^{166}Dy/^{166}Ho$; $^{167}Tm/^{167m}Er$; $^{172}Hf/^{172}Lu$; $^{178}W/^{178}Ta$; $^{191}Os/^{191m}Ir$; $^{194}Os/^{194}Ir$; $^{226}Ra/^{222}Rn$; and $^{225}Ac/^{213}Bi$.

Similar to operation of a $^{82}Sr/^{82}Rb$ generator, pressurized eluant from eluant reservoir 12 is passed through the radioisotope generator to release the daughter decay product into the eluant and thereby generate an eluate containing the daughter decay product. The type of eluant used may be selected based on the characteristics of the parent radioisotope and support material used for radioisotope generator 16. For example, in the case of a $^{68}Ge/^{68}Ga$ generator, a hydrochloric acid solution (e.g., 0.1-1 M HCl) as the eluant.

Radioisotope generator system 10 in the example of FIG. 1 also includes a nuclear radiation detector 34 and a controller 36. Detector 34 may be a gamma ray detector that detects gamma rays emanating from eluate generated by radioisotope generator 16. Controller 36 may receive data generated by detector 34 indicative of the amount and type (e.g., spectral distribution) of gamma ray radiation detected by 34. Controller 36 may further process the data to determine an activity of different isotopes in the eluate from which detector 34 detected gamma ray emissions, as described in greater detail below. Controller 36 may also manage the overall operation of radioisotope generator system 10, including initiating and controlling patient dosing procedures, controlling the various valves and pump(s) in the system, receiving and processing signals from detector 34, and the like.

Although not illustrated in FIG. 1, controller 36 may be communicatively coupled (e.g., via a wired or wireless connection) to the various pump(s), valves, and other components of system 10 so as to send and receive electronic control signals and information between controller 36 and the communicatively coupled components. The various components of system 10 may be contained on and/or within a radioisotope generator cart, such as a cart having the configuration described in U.S. Pat. No. 7,862,534, the entire contents of which are incorporated herein by reference. For example, radioisotope generator system 10 can be mounted on a movable cart (e.g., having a base frame on which the components of the system are mounted and wheels) so as to be movable about an operating room in which an infusion procedure is being performed.

In the illustrated example, detector 34 is positioned to detect radiation emitted from eluate at a location between a discharge of radioisotope generator 16 and second diverter valve 30. In particular, detector 34 is illustrated as being positioned to detect radiation emitted by eluate flowing through radioisotope discharge line 38. Detector 34 may be positioned in close proximity to discharge line 38 to detect radiation emanating from eluate in the line, such as adjacent to and, in some examples, in physical contact with an outer surface of the discharge line. For example, detector 34 may be positioned less than 5 inches from an outer surface of discharge line 38, such as less than 2 inches, less than 1 inch, less than ¼ of an inch, or less than 1/32 of an inch. In other examples, detector 34 may not be positioned to detect radiation from eluate in discharge line 38 but may be positioned to measure radiation at other locations within system 10. For example, as described with respect to FIG. 5, detector 34 may be positioned to detect radiation from an accumulator structure positioned downstream from radioisotope generator 16.

During operation, detector 34 can detect gamma ray emissions emanating from a sample of eluate flowing through and/or stopped within discharge line 38. Detector 34 may include a variety of different components to detect and process gamma ray radiation signals, such as a pulse sorter (e.g., multichannel analyzer), amplifiers, rate meters, peak position stabilizers, and the like. In one example, detector 34 comprises a scintillation detector. In another example, detector 34 comprises a solid-state semiconductor detector.

The specific type of gamma ray detector selected for detector 34 can vary based on a variety of factors such as, e.g., the required resolution of the detector, the physical requirements for practically implementing the detector in a system (e.g., cooling requirements), the expected sophistication of the personnel operating the detector, and the like. In some applications, detector 34 is a scintillator-type detector, such as a comparatively low-resolution alkali halide (e.g., NaI, CsI) or bismuth germanate (e.g., Bi4Ge3O12, or BGO). In other applications, detector 34 incorporates a higher-Z metallic species. An example is lutetium oxyorthosilicate, Lu2(SiO4)O(Ce) or LSO, which, though slightly better in resolution than BGO, may have limited applicability because of its relatively high intrinsic radiation. As another example, detector 34 may be a cerium-doped lanthanum, such as LaCl3(Ce) or LaBr3(Ce).

In other applications, detector 34 is a solid-state semiconductor-type detector, such as planar germanium detector. For instance, as another example, detector 34 may be a solid-state semiconductor-type telluride detector, such as cadmium-telluride or cadmium-zinc-telluride semiconductor detector. Detector 34 may be operated at room temperature or may be cooled below room temperature (e.g., by a cooling device incorporated into radioisotope generator system 10) to increase the resolution of detector.

Detector 34 can generate gamma ray spectroscopy data. For example, the detector may include a passive material that waits for a gamma interaction to occur in the detector volume. Example interactions may be photoelectric effects, Compton effects, and pair production. When a gamma ray undergoes a Compton interaction or pair production, for instance, a portion of the energy may escape from the detector volume without being absorbed so that the background rate in the spectrum is increased by one count. This count may appear in a channel below the channel that corresponds to the full energy of the gamma ray.

A voltage pulse produced by detector 34 can be shaped by a multichannel analyzer associated with the detector. The multichannel analyzer may take a small voltage signal produced by the detector, reshape it into a Gaussian or trapezoidal shape, and convert the signal into a digital signal. The number of channels provided by the multichannel analyzer can vary but, in some examples, is selected from one of 512, 1024, 2048, 4096, 8192, or 16384 channels. The choice of the number of channels may depend on the resolution of the system, the energy range being studied, and the processing capabilities of the system.

Data generated by detector 34 in response to detecting gamma ray emissions may be in the form of a gamma ray spectrum that includes peaks. The peaks may correspond to different energy levels emitted by different isotopes within an eluate sample under analysis. These peaks can also be called lines by analogy to optical spectroscopy. The width of the peaks may be determined by the resolution of the detector, with the horizontal position of a peak being the energy of a gamma ray and the area of the peak being determined by the intensity of the gamma ray and/or the efficiency of the detector.

Figure 2:
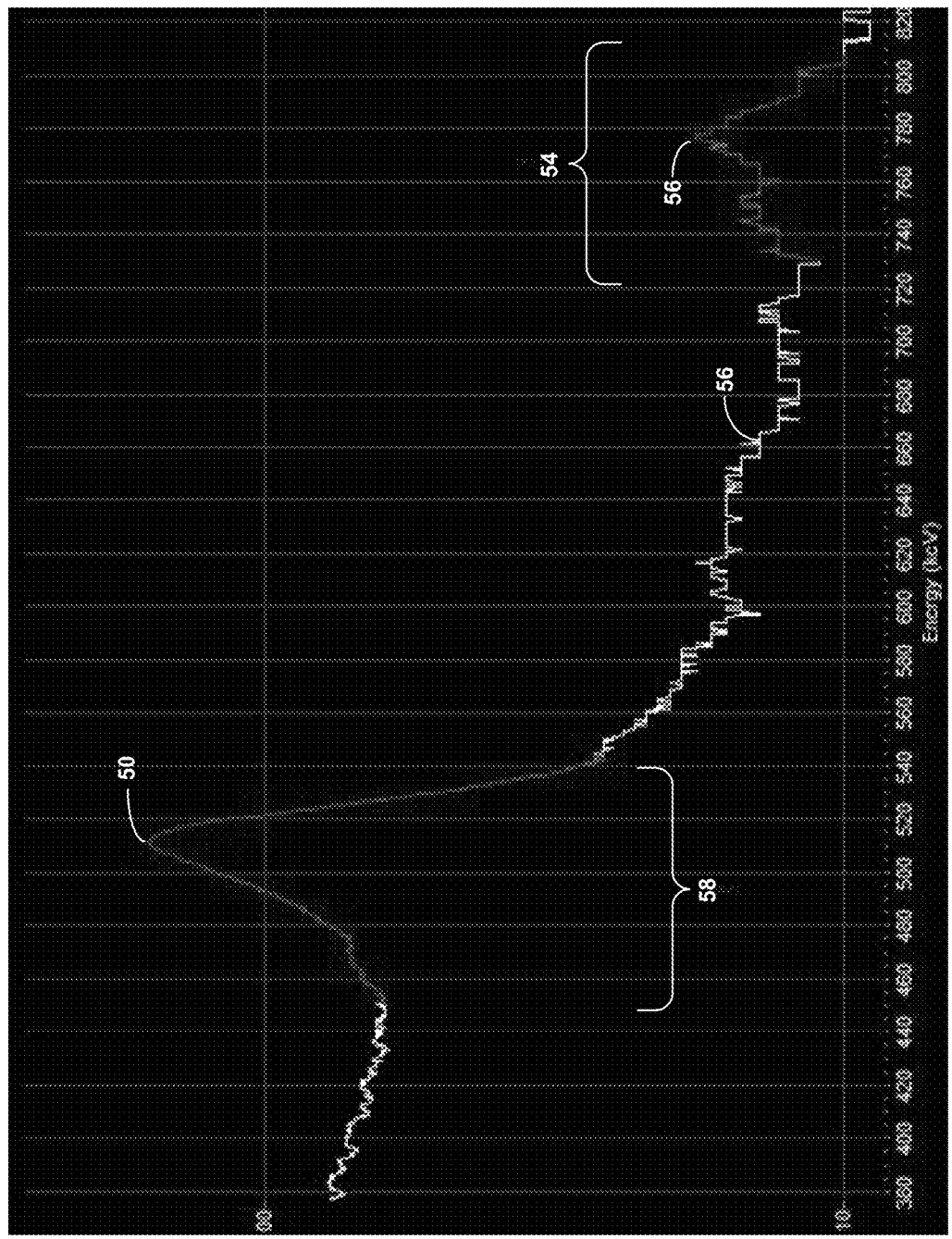
FIG. 2 is a plot of an example gamma ray spectrum that may be generated using the radioisotope generator system of FIG. 1.

FIG. 2 is a plot of an example gamma ray spectrum that may be generated in response to measuring gamma ray radiation emitted by an eluate generated via a $^{82}$Sr/$^{82}$Rb generator. As shown in this example, the gamma ray spectrum includes a first peak 50 in the energy range of 500-520 keV and a second peak 52 in the energy range of 760-780. Eluate generated using a $^{82}$Sr/$^{82}$Rb generator may be expected to have some amount of strontium-85 as well as some amount of rubidium-82. Rubidium-82 is known to emit gamma radiation at two different energy ranges: the 511 keV line and the 776 keV line. Further, strontium-85 is known to emit gamma radiation at the 514 keV line. Accordingly, the first peak 50 in the spectrum may represent the combined amount of gamma radiation emitted by the 511 keV line of rubidium-82 as well as the 514 keV line of strontium-85. By contrast, the second peak 52 in the spectrum may represent the amount of gamma radiation emitted by the 776 keV line of rubidium-82.

As shown in the example spectrum of FIG. 2, the first peak 50 may reveal itself as a single, unbroken peak encompassing both the 511 keV and 514 keV energy lines. This may occur when the resolution of the detector is below the resolution required to separately resolve the 511 keV line and the 514 keV line. In practice, few commercially available detectors can suitably resolve the 511 keV line from the 514 keV so that first peak 50 reveals itself as two separate peak, one of which encompasses the 511 keV line and the other of which encompasses the 514 keV energy line.

Consequently, simple spectrum analysis in which the area under the peak is integrated to determine the activity associated with a single isotope emitting at that peak cannot be performed when using these detectors. Rather, the radiation emitted by rubidium-82 at the 511 keV line interferes with spectral analysis of the radiation emitted by strontium-85 at the 514 keV line. Similarly, radiation emitted by strontium-85 at the 514 keV line interferes with the radiation emitted by rubidium-82 at the 511 keV line.

Figure 3:
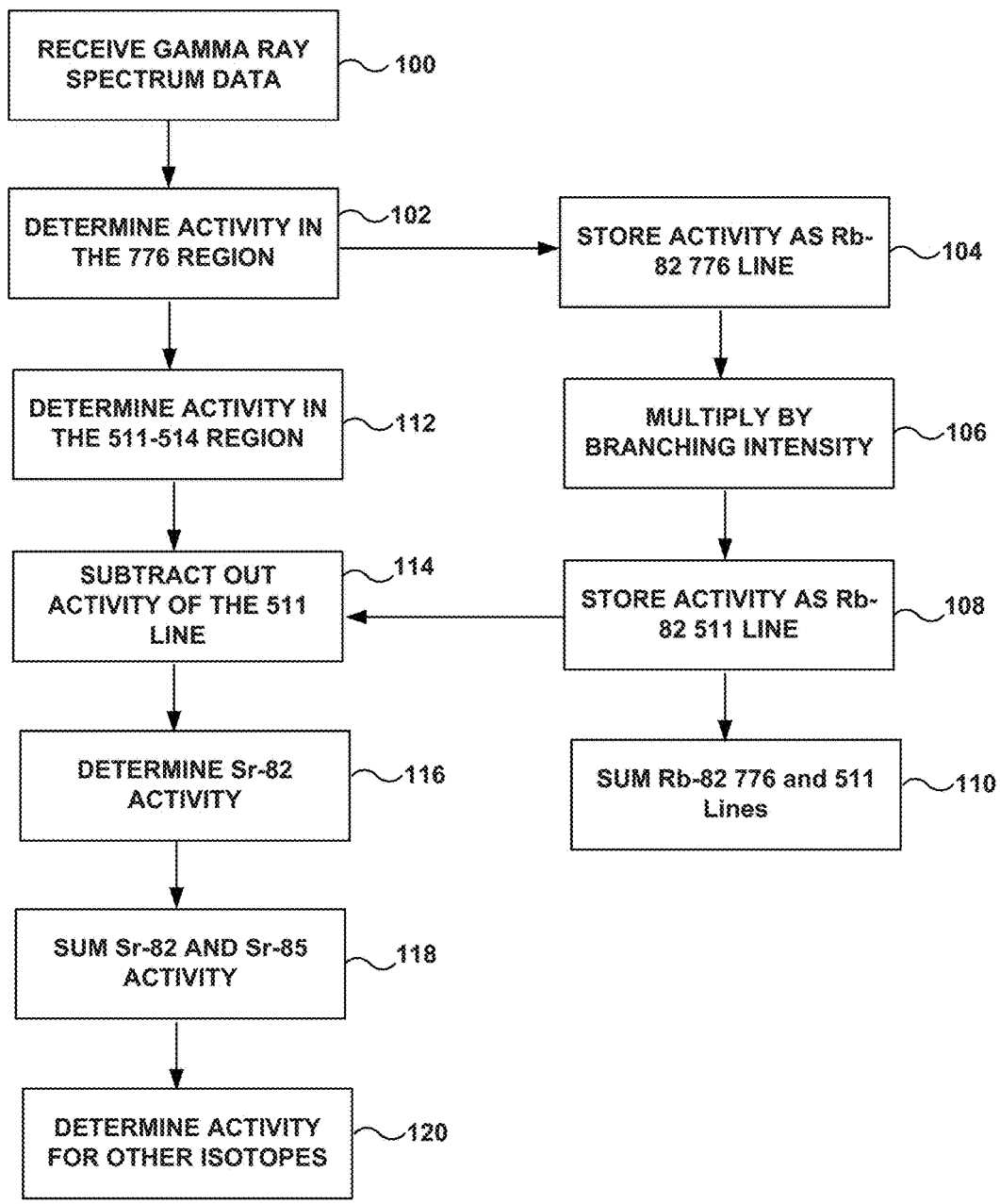
FIG. 3 is a flow diagram of an example technique that may be used measure the activity of individual isotopes in the radioisotope generator system of FIG. 1.

FIG. 3 is a flow diagram of an example technique that may be used to resolve interfering gamma ray emissions to determine activities for each of a plurality of radioisotopes in a sample under analysis. For example, the technique of FIG. 3 may be used by radioisotope generator system 10 of FIG. 1 to determine an activity of strontium-82, an activity of strontium-85, and/or an activity of rubidium-82, among other isotopes, in a sample of eluate generated by radioisotope generator 16. In the example technique, controller 36 receives gamma ray spectroscopy data from detector 34 indicative of the gamma radiation (e.g., magnitude, distribution) detected by detector 34 from the eluate (100). Detector 34 may detect, and controller 36 may receive, the gamma radiation as the eluate flows through discharge line 38. For example, eluant pump 14 may pump eluant through radioisotope generator 16 at a rate ranging from 25 ml/min to 75 ml/min (e.g., 50 min/min), resulting in an eluate flow rate ranging from 25 ml/min to 75 ml/min. Detector 34 may continuously detect gamma rays emitted by eluate flowing through discharge line 38 at this rate. As the concentration of radioisotopes in the eluate change, detector 34 may detect changing gamma radiation from the eluate. In other examples, detector 34 does not detect radiation from a flowing source of liquid isotopes but rather from a static volume of isotopes. For example, eluate may be statically positioned in front of detector 34 (e.g., by closing second diverter valve 30) so as to hold a non-moving volume of eluate in front of the detector. This may be useful, e.g., to perform periodic linearity/constancy checks on the system.

Upon receiving gamma ray spectroscopy data from detector 34, controller 36 may determine an amount of activity associated with second peak 52 (FIG. 2) and the 776 keV line of the spectrum (102). In general, activity may be reported in Becquerel (Bq) or Curie (Ci) and is a function of the composition of a particular isotope and the concentration of the isotope in the eluate. To determine the amount of activity associated with the 776 keV peak, controller 36 may identify a region of interest encompassing the 776 keV peak and integrate the area under the peak. The region of interest may be a region defined between two different energy lines that includes the peak of interest and bounds the region under which the peak area is integrated to determine corresponding activity.

For example, when a peak is formed in the gamma ray spectrum (e.g., representing a specific radionuclide), the peak may reside in the continuum and include events in the continuum just under the peak. This energy region of the peak including continuum events is generally called the region of interest. The beginning and end points of the region of interest can be determined by using an algorithm performing a second derivative function or, if enough statically significant data is available, by visual inspection of a spectrum.

To determine the activity of a radionuclide associated with a certain energy line, the continuum within the region of interest may be subtracted from all the events in the peak. This operation (subtracting the continuum from all events in the peak) is referred to as calculating the net peak integral and may be performed by controller 36.

FIG. 2 shows second peak 52 having a region of interest 54 extending above the continuum 56 and first peak 50 having a region of interest 58 extending above the continuum. In spectroscopy, photons that impart all their energy to the detector form a "photo peak" (usually just called peak) in the spectrum. However, scattered events, primarily from Compton scattering, occur because full absorption of the photon energy did not take place in the detector and these less-than-full energy events are observed from the highest peak energy to the lowest energy in the spectrum. This nearly smooth curve of events running through the spectrum is typically called the continuum. Sometimes the continuum is also referred to as the background, which may be subtracted by controller 36 for the purpose of calculating activity.

With further reference to FIG. 3, controller 36 can determine the net peak integral count in the region of interest encompassing the 776 keV peak (102). Controller 36 can store this determined activity as the activity of the 776 keV line of rubidium-82 in a memory associated with the controller (104). Subsequently, controller 36 can determine an activity of the 511 keV line of rubidium-82 based on the determined activity of the 776 keV line of the isotope and branching intensity factor (106). Gamma radiation emitted by rubidium-82 is known to branch between the 511 keV line and the 776 keV line at a known ratio. This ratio, which may be referred to as a branching intensity factor, can be stored in a memory associated with controller 36. The branching intensity factor of rubidium-82 is typically reported as being approximately 1:13 for the 776 keV line/511 keV line. As a result, controller 36 may multiply the activity determined for the 776 keV line of rubidium-82 by the branching intensity factor (e.g., 13). Controller can then store this determined activity as the activity of the 511 keV line of rubidium-82 in a memory associated with the controller (108). In some examples, controller 36 determines a total amount of activity for rubidium-82 in the eluate sample under investigation by summing the determined activity for the 776 keV line of the rubidium with the determined activity for the 511 keV line (110).

The example technique of FIG. 3 further includes determining an amount of activity associated with first peak 50 (FIG. 2) and the 511-514 keV lines of the spectrum (112). Controller 36 can identify a region of interest encompassing the 511-514 keV peak, as discussed above with respect to the 776 keV peak, and determine the net peak integral count for the identified region of interest. Once controller 36 identifies the amount of activity associated with the 511-514 keV lines of the spectrum, the controller can determine the amount of strontium-85 in the eluate based on the determination (114). As discussed above, the amount of activity in the first peak 50 encompassing the 511 keV and 514 keV lines may be the combined activity from the 511 keV line of rubidium-82 and the 514 keV line of strontium-85. Controller 36 may subtract the amount of activity determined for the 511 keV line of rubidium-82 (e.g., as described with respect to step 106 of FIG. 3) from the total amount of activity determined for the 511-514 keV lines of the spectrum (114). Controller 36 can store the resulting value as the activity of rubidium-85 in the eluate under investigation.

In some examples, controller 36 further determines an activity of strontium-82 based on the determined activity of strontium-85 (116). The activity of strontium-82 is related to the activity of strontium-85 by a known isotope ratio, which may be stored in memory associated with controller 36. Controller 36 can determine the activity of strontium-82 by multiplying the activity of strontium-85 by the stored ratio to determine the activity of strontium-82 in the eluate. In some examples, controller sums the determined activity of strontium-85 with the determined activity of strontium-82 to identify the total amount of strontium activity in the eluate (118).

If desired, controller 36 can identify the amount of activity associated with other isotopes in the eluate based on the gamma ray spectroscopy data received from detector 34 (120). Controller 36 can identify region(s) of interest encompassing other peaks in the spectrum and determine a net peak integral count for the peak(s). Each peak may correspond to a particular radioisotope, and the correspondence between different peaks and different isotopes may be stored in a memory associated with the controller.

As one example, controller 36 may identify an amount of activity provided by cesiuim-131 in the eluate (if any). Cesium-131 emits gamma radiation at the 32 keV line and may be a contaminant in the eluate. Controller 36 can identify a region of interest encompassing the 32 keV peak and determine the net peak integral count for the identified region of interest to determine the amount of activity associated with cesium-131.

To help ensure that activity measurements made by detector 34 during operation of radioisotope generation system 10 are accurate, the detector may be calibrated. The detector may be calibrated periodically in use in system 10 and/or calibrated prior to installation and use in the system (e.g., at a facility that is physically remote from the facility where system 10 resides).

Figure 4:
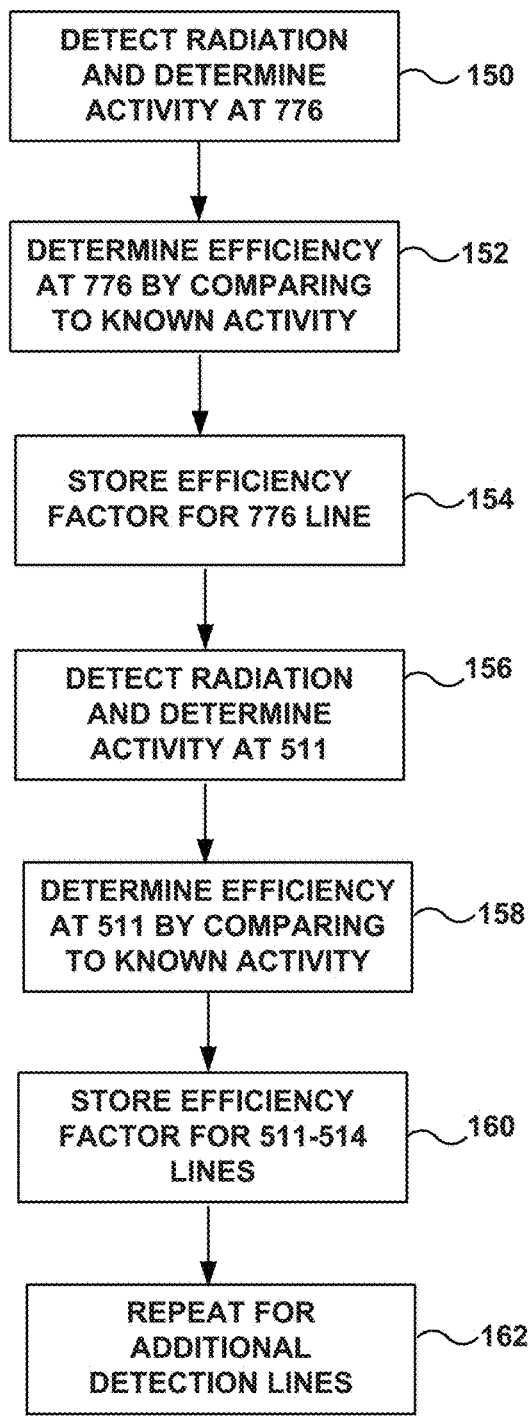
FIG. 4 is a flow diagram of an example technique that may be used to calibrate a detector.

FIG. 4 is a flow diagram of an example technique that may be used to calibrate a detector, such as detector 34, which is subsequently used in radioisotope generator system 10. In the example technique, an isotope having a known activity and emitting gamma radiation at or around the 776 keV line (e.g., within a range of plus or minus 5 keV) of the spectrum is positioned before detector 34 so that the detector detects the emitted radiation (150). In one example, the isotope is liquid cesium-134, which emits at the 774 keV line of the spectrum. The isotope may be statically positioned before the detector for a period of time or may be flowed past the detector. For example, when detector 34 is going to be used to measure radioactivity from eluate flowing through a line in system 10, detector 34 may be calibrated by flowing the isotope having the known activity past the detector (e.g., a the same rate as eluate will flow past the detector in operation).

After detecting radiation emanating from the isotope having the known activity, a controller associated with the calibration process (or detector 34 itself, in other examples) may identify a region of interest encompassing the 776 keV peak in a gamma ray spectrum generated from the sample. The region of interest may be the same region of interest subsequently used to determine the activity associated with the 776 keV line of rubidium-82 during operation of system 10. The controller can determine the net peak integral count for region of interest to determine the amount of activity measured by detector 34 at or around the 776 keV line for the isotope having the known activity.

Subsequently, the controller can determine an efficiency factor (e.g. a calibration factor) for detector 34 at the 776 keV line (152). The controller may divide the detected activity of the isotope at or around the 776 keV line (e.g., the net peak integral measured for the isotope over the 776 keV region of interest) by the known activity at or around the 776 keV line for the isotope. The controller can store this efficiency factor in a memory associated with detector 34 (154), which may be referenced during operation of system 10.

For example, after measuring the activity of the 776 keV line of rubidium-82 during operation of system 10 (e.g., determining the net peak integral count over the 776 keV region of interest), the measured activity may be adjusted using the efficiency factor. Controller 36 can divide the net peak integral count measured over the 776 keV line for rubidium-82 by the detector's efficiency factor for the 776 keV line. This adjusted activity can then be used in subsequent activity calculations, as described with respect to FIG. 3.

With further reference to FIG. 4, the example technique further includes positioning a second isotope having a known activity and emitting gamma radiation at or around the 511 keV line (e.g., within a range of plus or minus 5 keV) of the spectrum before detector 34 so that the detector detects the emitted radiation (156). In one example, the isotope is liquid sodium-22, which emits at the 511 keV line of the spectrum. The isotope may be statically positioned before the detector for a period of time or may be flowed past the detector.

After detecting radiation emanating from the isotope having the known activity, a controller associated with the calibration process (or detector 34 itself, in other examples) may identify a region of interest encompassing the 511 keV peak in a gamma ray spectrum generated from the sample. The region of interest may be the same region of interest subsequently used to determine the activity encompassing the 511 keV line of rubidium-82 and the 514 keV line of strontium-85 during operation of system 10. The controller can determine the net peak integral count for region of interest to determine the amount of activity measured by detector 34 at the 511 keV line for the isotope having the known activity.

Subsequently, the controller can determine an efficiency factor (e.g. a calibration factor) for detector 34 at or around the 511 keV line (154). This efficiency factor may be representative of the efficiency of the detector at region encompassing both the 511 keV line and the 514 keV line. The controller may divide the detected activity of the isotope at the 511 keV line (e.g., the net peak integral measured for the isotope over the 511 keV and 514 keV region of interest) by the known activity at or around the 511 keV line for the isotope. The controller can store this efficiency factor in a memory associated with detector 34 (158), which may be referenced during operation of system 10.

For example, after measuring the activity of the 511 keV line of rubidium-82 and the 514 keV line of strontium-85 during operation of system 10 (e.g., determining the net peak integral count over the 511 keV and 514 keV region of interest), the measured activity may be adjusted using the efficiency factor. Controller 36 can divide the net peak integral count encompassing the 511-514 keV lines by the detector's efficiency factor for the 511 keV line. This adjusted activity can then be used in subsequent activity calculations, as described with respect to FIG. 3.

The calibration technique on detector 34 can be repeated using additional isotopes having known activities and emitting gamma radiation at the energies that will subsequently be measured using the detector during operation (162). As one example, detector 34 may be calibrated for the 32 keV line used to measure the activity of cesium-131 in system 10. During calibration, an isotope having a known activity and emitting gamma radiation at or around the 32 keV line of the spectrum can be positioned before (e.g., flowed passed)

detector 34 so that the detector detects the emitted radiation. Liquid cesium-137 has a multiplet at 32 keV and may be used as a calibration isotope. After detecting radiation emanating from the isotope having the known activity, a controller associated with the calibration process (or detector 34 itself, in other examples) may identify a region of interest encompassing the 32 keV peak in a gamma ray spectrum generated from the sample. The region of interest may be the same region of interest subsequently used to determine the activity of the 32 keV line for cesium-131. The controller can determine the net peak integral count for region of interest and, upon comparing the measured net peak integral activity with the known activity, determine an efficiency factor for the 32 keV for the detector. This efficiency factor may be stored in a memory associated with controller 36 and referenced during operation of system 10.

With further reference to FIG. 1, system 10 can store and/or use radioisotope activity information monitored by and/or determined by controller 36 via detector 34 in a number of different ways. In one example, controller 36 stores activity data generated during operation of radioisotope generator 16 in a memory associated with the system. The memory may be at the same physical location generator or may be at a physically remote location. The data may allow the operational performance and integrity of system 10, including radioisotope generator 16, to be monitored and evaluated. In some additional examples, controller 36 may actively control system 10 based on radioactivity data determined via detector 34.

For example, controller 36 may compare a measured activity for a particular isotope or combination of isotopes in eluate generated by system 10 to one or more thresholds stored in memory. The threshold(s) may relate to a maximum amount of isotope that can be dosed at any one time. Examples of such thresholds may include a maximum strontium-82 dose of 0.01 µCi per mCi of rubidium-82 being dosed and/or a maximum strontium-85 dose of 0.1 µCi per mCi of rubidium-82 being dosed. For example, the thresholds may include a maximum strontium-82 dose of 0.02 µCi per mCi of rubidium-82 being dosed and/or a maximum strontium-85 dose of 0.2 µCi per mCi of rubidium-82 being dosed. The threshold(s) may also relate to a maximum amount of isotope that can be dosed over a given period of time, such as a patient dosing procedure. An example of such a threshold may be a dose of rubidium-82 of 2220 MBq (60 mCi) over the course of a dosing procedure for a single patient.

Controller 36 may take a variety of actions when a threshold is exceeded. As one example, controller 36 may initiate a user alert (e.g., a visual, textual, audible user alert). As another example, controller 36 may shut down eluant pump 14 so as to cease generating eluate. As yet another example, controller 36 may control second diverter valve 30 to divert elute from patient line 28 to waste line 32.

A variety of additional actions can be performed using system 10. As an example, a periodic constancy check may be performed on system 10, including detector 34, by positioning a calibration source in close proximity to the detector. For example, a source of cesium-137 emitting at the 661.7 keV line may be positioned adjacent to detector 34. Periodically (e.g., daily), system 10 will measure activity emitted from the isotope and, upon referencing the half-life of the isotope stored in a memory associated with the system, determine if the system is calibrated and functioning properly.

As another example, a periodic (e.g., quarterly) linearity check may be performed on system 10, including detector 34, e.g., by eluting a sample of rubidium-82 and holding the sample statically in front of detector 34 as the sample decays over at least one order of magnitude of activity (e.g., several half-lives). System 10 can determine the linearity of the activity measurements made by detector 34 over the decay process, e.g., to identify if the system is functioning properly.

As discussed above with respect to FIG. 1, radioisotope generator 16 can be configured with a variety of different parent radioisotopes to produce daughter decay products besides rubidium-82 for injection into a patent. When using different parent-daughter radioisotope pairs, different system arrangements and techniques can be used to resolve gamma ray emissions from different isotopes and/or determine the activities for each of a plurality of radioisotopes in a sample under analysis.

Figure 5:
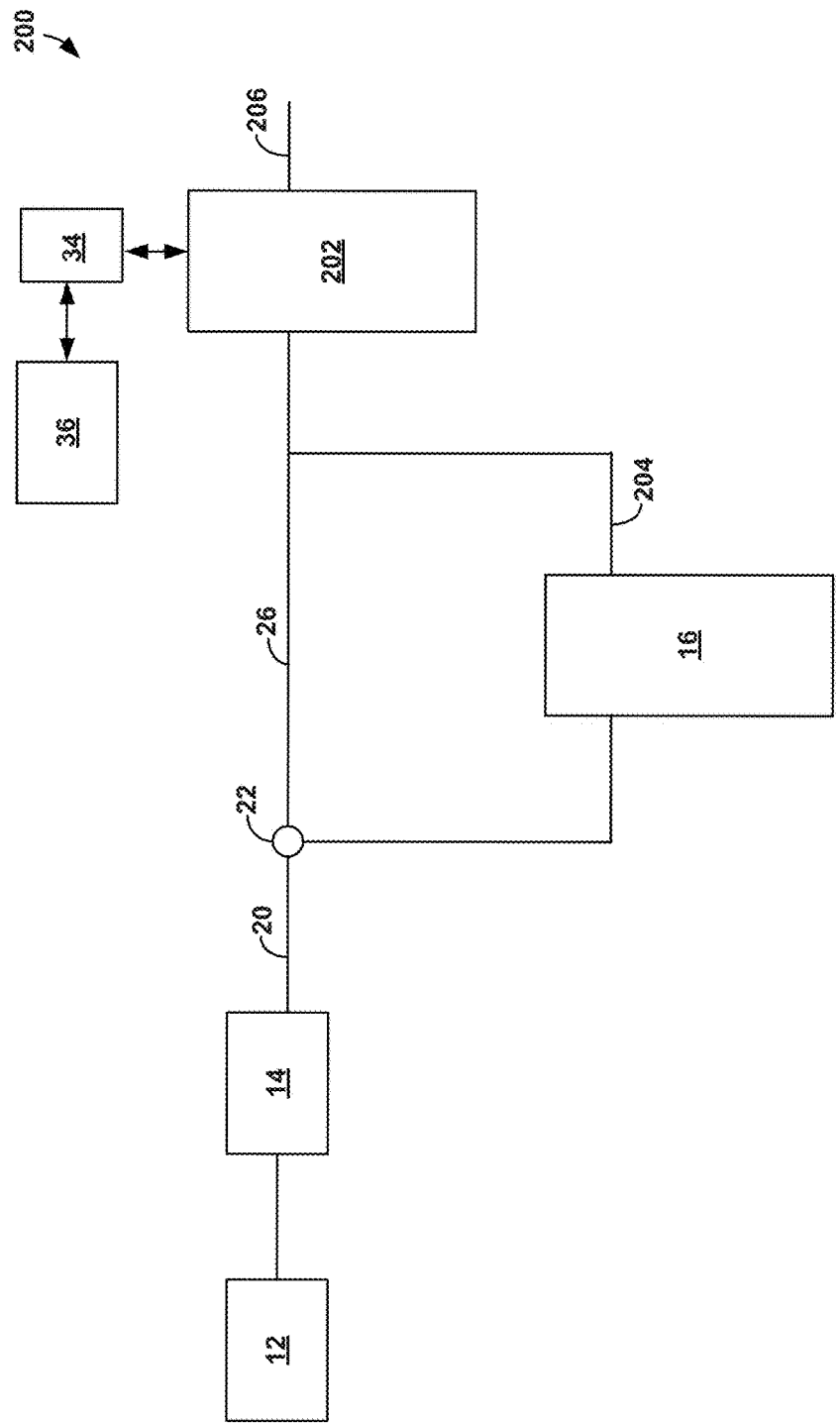
FIG. 5 is a block diagram of another example radioisotope generator system that may generate radioisotopes.

FIG. 5 is a block diagram illustrating another example radioisotope generator system 200 in which different radioisotopes may be detected and quantified using systems and methods in accordance with the disclosure. Like reference numerals in radioisotope generator system 200 in FIG. 5 to radioisotope generator system 10 in FIG. 1 refer to like elements. As shown, radioisotope generator system 200 includes previously-described eluant reservoir 12, eluant pump 14, and radioisotope generator 16. Eluant pump 14 receives eluant from eluant reservoir 12, pressurizes the eluant, and discharges pressurized eluant into radioisotope generator 16 via eluant line 20.

Radioisotope generator system 200 also includes a radioisotope accumulator structure 202 positioned downstream from radioisotope generator 16. Radioisotope accumulator structure 202 receives eluate from radioisotope generator 16 via elute line 204. Eluate flows over and/or through radioisotope accumulator structure 202 and is discharged for downstream processing or patent injection via line 206. In addition, radioisotope generator system 200 includes diverter valve 22 controlling the flow of eluant to one of radioisotope generator 16 and accumulator structure 202. Eluant flowing through radioisotope generator bypass line 26 bypasses radioisotope generator 16 and can flow directly into accumulator structure 202.

During operation, radioisotope generator 16 can generate radioisotopes via elution, as discussed above. Radioisotope generator 16 contains a parent radioisotope bound on a support material, such as a columnar-shaped support material through with eluant flows during operation. The parent radioisotope may bind more strongly to the support material than daughter decay product produced via radioactive decay of the radioisotope. As a result, when pressured eluant from eluant reservoir 12 is passed through radioisotope generator 16, the eluant may release daughter decay product so as to generate eluate containing the daughter decay product.

To detect and/or quantify various radioisotopes present in the eluate produced by radioisotope generator 16, radioisotope generator system 200 also includes a radiation detector 34, as further described with respect to FIG. 1. Detector 34 can be a gamma ray detector that detects gamma rays emanating from eluate generated by radioisotope generator 16. Detector 34 can be implemented using any of the detectors discussed above with respect to FIG. 1. In operation, controller 36 can receive data generated by detector 34 indicative of the amount and type (e.g., spectral distribution) of gamma ray radiation detected by detector 34 and determine therefrom an activity of various radioisotopes present in the eluate produced by radioisotope generator 16.

One of the radioisotopes that may be desirably identified and/or quantified in eluate generated by radioisotope generator 16 is the parent radioisotope contained within the generator. The parent radioisotope within radioisotope generator 16 is intended to remain bound to the support material contained in the generator during elution, releasing only daughter radioisotope into the eluant. This is because the parent radioisotope has a longer half-life than the corresponding daughter radioisotope and, if injected into a patient, will provide a source of radioactivity that persists in the patient for longer than the daughter radioactivity. In practice, however, a small amount of the parent radioisotope may release into the eluant, with the amount of parent radioisotope releasing during each elution increasing over time with successive elution runs. For this reason, it can be useful to detect and quantify the amount of parent radioisotope present in the eluate produced by radioisotope generator 16 to ensure that any parent radioisotope, if present, does not exceed and allowable threshold.

While desirable to identify and/or quantify, a parent radioisotope present in eluate flowing from radioisotope generator 16 past detector 34 may have a sufficiently small activity and/or lack gamma emissions such that it is difficult to resolve the parent radioisotope from the daughter radioisotope. To help resolve the radioisotopes in these situations, the daughter radioisotope may be separated from the parent radioisotope before measuring the gamma spectrum emitted by the eluate. In the example of FIG. 5, radioisotope generator system 200 includes accumulator structure 202 to help detect and quantify any parent radioisotope present in eluate received from radioisotope generator 16.

Accumulator structure 202 may be a structure (e.g., material) that preferentially binds any parent radioisotope present in the eluate received via line 204 such that parent radioisotope is attracted out of the eluate and binds to the structure. Conversely, daughter radioisotope present in the eluate may pass over and/or through accumulator structure 202 without substantially binding to the structure, thereby concentrating and separating at least a portion of the parent radioisotope in accumulator structure 202 from the daughter radioisotope. Once concentrated and separated from the daughter radioisotope in accumulator structure 202, detector 34 can measure gamma radiation emanating from the parent radioisotope (or a daughter decay product thereof), allowing the activity of the parent radioisotope to be quantified.

Accumulator structure 202 can be fabricated from any materials that a parent radioisotope in a generator system preferentially binds to over a daughter radioisotope. For example, accumulator structure 202 can be made from the same or similar materials as the support material in radioisotope generator 16 on which the parent radioisotope is deposited and bound. In various configurations, the support material and/or accumulator structure 202 may be stannic oxide, tin oxide, an organic matrix, or yet other material.

Accumulator structure 202 may provide an enclosed cavity in fluid communication with lines 204 and 206 that contains the material preferentially binding the parent radioisotope. Such material may be non-porous or porous. In some examples, accumulator structure 202 is implemented using a second generator column positioned downstream from radioisotope generator 16. The second generator column may be the same as or similar to a generator column in radioisotope generator 16 (but be devoid of parent radioisotope upon the start of system 200, with parent radioisotope accumulating on the second column over time).

To detect one or more radioisotopes accumulating on or in accumulator structure 202, detector 34 may be positioned to detect radiation emitted from the structure. In the example of FIG. 5, detector 34 is illustrated as being positioned to detect radiation emitted from the parent radioisotope captured by accumulator structure 202. In other examples, detector 34 may be positioned in other locations, such as downstream of accumulator structure 202 to detect gamma radiation emitted from liquid passing over or through accumulator structure 202 and picking up accumulated parent radioisotope.

During operation, detector 34 can detect gamma ray emissions emanating from accumulated parent radioisotope (or a decay product thereof) within and/or downstream of accumulator structure 202. Controller 36 may receive data generated by detector 34 indicative of the amount and type (e.g., spectral distribution) of gamma ray radiation detected by detector 34. Controller 36 may further process the data to determine an activity of different isotopes in the eluate from which detector 34 detected gamma ray emissions.

During operation of radioisotope generator system 200, controller 36 can control the system to generate eluate the flows through accumulator structure 202. Controller 36 may instruct eluant pump 14 to pump eluant from eluant reservoir 12 through radioisotope generator 16 via eluant line 20. As the pressured eluant flows through radioisotope generator 16, daughter radioisotope generated by radioactive decay of parent radioisotope bound on a support material in the generator can leave the support material and enter the eluant, producing the eluate. The eluate discharges from radioisotope generator 16 via line 206 and flows through accumulator structure 202, subsequently discharging from accumulator structure 202 via line 206. For example, eluant pump 14 may pump eluant through radioisotope generator 16 and accumulator structure 202 at a rate ranging from 25 ml/min to 75 ml/min (e.g., 50 min/min), resulting in an eluate flow rate ranging from 25 ml/min to 75 ml/min.

As eluate is discharging from radioisotope generator 16 and flowing through accumulator structure 202, controller 36 may receive gamma ray spectroscopy data from detector 34 indicative of the gamma radiation (e.g., magnitude, distribution) detected by detector 34 from the eluate. Detector 34 may detect, and controller 36 may receive, the gamma radiation as the eluate flows through accumulator structure 202. Detector 34 may continuously detect gamma rays emitted by eluate flowing through the structure during elution.

Upon receiving gamma ray spectroscopy data from detector 34, controller 36 may determine an amount of activity associated with one or more radioisotopes (e.g., a daughter radioisotope) in the eluate. To determine the amount of activity associated with a radioisotope of interest, controller 36 may identify a region of interest encompassing an energy line at which the radioisotope of interest emits and integrate the area under the peak. The region of interest may be a region defined between two different energy lines that includes the peak of interest and bounds the region under which the peak area is integrated to determine corresponding activity.

While eluate is flowing through accumulator structure 202 and controller is determining the activity of a radioisotope (e.g., daughter radioisotope) in the eluate, parent radioisotope may be accumulating on or in accumulator structure 202. To determine the activity of such parent radioisotope in the eluate, controller 36 can control system 200 to cease elution. For example, controller 36 can control diverter valve 22 to redirect the flow of eluant from radioisotope generator 16 to accumulator structure 202 via bypass line 26. Eluant flowing directly to accumulator structure 202 via bypass line 26 can push residual eluate (and daughter radioisotope) through accumulator structure 202.

After suitably flushing accumulator structure 202 (e.g., with at least 5 ml of eluant, such as at least 10 ml eluant), controller 36 can control gamma detector 34 to measure the amount of gamma radiation emanating from accumulator structure 202 and/or eluant in or flowing through the structure. Since daughter radioisotope present in the eluate has been flushed through accumulator structure 202, substantially any radioactivity measured by detector 34 may be attributed to parent radioisotope captured on the accumulator structure (or a decay product thereof), thereby providing an indication of the amount of parent radioisotope present in the eluate.

For example, controller 36 may receive gamma ray spectroscopy data from detector 34 indicative of the gamma radiation (e.g., magnitude, distribution) detected by detector 34 from accumulator structure 202 and/or eluant in or flowing through the structure. Upon receiving gamma ray spectroscopy data from detector 34, controller 36 may determine an amount of activity associated with one or more radioisotopes (e.g., a parent radioisotope) emitting radiation. To determine the amount of activity associated with a radioisotope of interest, controller 36 may identify a region of interest encompassing an energy line at which the radioisotope of interest (e.g., parent radioisotope or a decay product thereof) emits and integrate the area under the peak. The region of interest may be a region defined between two different energy lines that includes the peak of interest and bounds the region under which the peak area is integrated to determine corresponding activity.

Once controller 36 determines an activity of the parent radioisotope based on the magnitude of the measured gamma radiation, controller 36 may adjust the measured activity to determine the amount of parent radioisotope present in the eluate generated by radioisotope generator 16. The amount of parent radioisotope captured on or in accumulator structure 202 that emits gamma radiation can vary over the life of radioisotope generator system 200. Initially, accumulator structure 202 may contain no parent radioisotope such that substantially any gamma radiation measured from accumulator structure 202 after an initial elution may be attributed to parent radioisotope released from radioisotope generator 16. Overtime, parent radioisotope can accumulate on accumulator structure 202 such that during subsequent elutions, a portion of the gamma radiation emitted by parent radioisotope captured on accumulator structure 202 can be attributed to parent radioisotope captured during prior elutions and another portion can be attributed to parent radioisotope captured during a current run in which the activity of parent radioisotope present in the eluate is desired to be quantified. For this reason, controller 36 may decrease the measured activity of the parent radioisotope by an amount proportional to the percentage of the parent radioisotope attributable to prior elution runs as opposed to the current elution run.

Controller 36 may also increase the measured activity of the parent radioisotope to account for the capture efficiency of accumulator structure 202. While accumulator structure 202 can preferentially bind parent radioisotope to the structure, the structure may not be capable of capturing all parent radioisotope present in the eluate generated by radioisotope generator 16. Accordingly, the amount of parent radioisotope determined to be in the eluate sample based on the measured gamma radiation (as optionally adjusted to account for any legacy parent radioisotope from prior elution runs) can be upwardly adjusted to reflect the capture efficiency of accumulator structure 202. The resulting value can be established as the measured activity of parent radioisotope in the eluate being analyzed.

Figure 6:
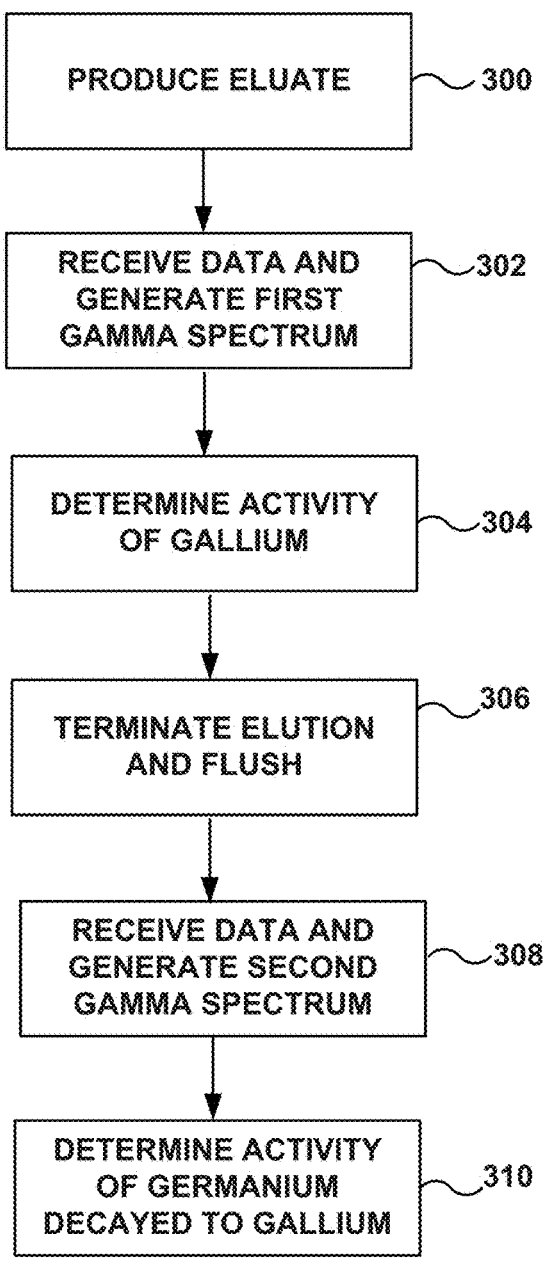
FIG. 6. is a flow diagram of an example technique that may be used measure the activity of individual isotopes in the radioisotope generator system of FIG. 5.

FIG. 6 is a flow diagram of an example technique that may be used to detect and quantify a parent radioisotope, a daughter radioisotope, and/or any other desired radioisotopes in a system according to the example of FIG. 5. For example, the technique of FIG. 6 may be used by radioisotope generator system 200 of FIG. 1 to determine an activity of germanium-68 and/or gallium-68. In this application, radioisotope generator 16 may be a $^{68}$Ge/$^{68}$Ga generator that produces $^{68}$Ga from radioactive decay of $^{68}$Ge.

In the example technique, controller 36 controls eluant pump 14 to pump pressurized eluant (e.g., HCl solution) through radioisotope generator 16, producing an eluate containing gallium-68 and germanium-68 that discharges from line 204 (300). The eluate flows over and/or through accumulator structure 202, causing a portion of the germanium-68 to bind to the accumulator structure. In one configuration, accumulator structure 202 is a chemistry column (e.g., having a shape and/or construction that is the same as the generator column in radioisotope generator 16 except that the generator column is loaded with germanium whereas the chemistry column is devoid of germanium upon start up). The chemistry column may function to remove germanium-68 from the eluate and/or neutralize the pH of the eluate for injection. For example, accumulation structure 202 may be an ion exchange member that functions to remove germanium-68 from the eluate. The chemistry column may be positioned upstream from or form part of a chemistry vial or chemistry cassette containing reagents for reacting with the eluate. The amount of germanium-68 binding to the chemistry column may be greater than the amount of gallium-68 binding to the column.

During elution, controller 36 receives gamma ray spectroscopy data from detector 34 indicative of the gamma radiation (e.g., magnitude, distribution) detected by detector 34 from the eluate flowing through and/or over accumulator structure 202 (302). Detector 34 may continuously or periodically detect gamma rays emitted by eluate flowing through accumulator structure 202. As the concentration of radioisotopes in the eluate change, detector 34 may detect changing gamma radiation from the eluate.

Upon receiving gamma ray spectroscopy data from detector 34, controller 36 may determine an amount of activity associated with gallium-68 (304). Gallium-68 emits at the 511 keV line of the spectrum. By contrast, germanium-68 does not emit within the gamma spectrum. Accordingly, substantially any or all gamma radiation measured by gamma detector 34 from the eluate may be attributed to gallium-68. To determine the amount of activity associated with gallium-68, controller 36 may identify a region of interest encompassing the 511 keV peak and integrate the area under the peak. The region of interest may be a region defined between two different energy lines that includes the peak of interest and bounds the region under which the peak area is integrated to determine corresponding activity. Controller 36 may store this determined activity as the activity of gallium-68.

After generating a desired amount of eluate, the technique of FIG. 6 includes terminating elution and optionally flushing accumulator structure 202 (306). In one example, controller 36 controls diverter valve 22 to redirect the flow of eluant from radioisotope generator 16 to accumulator structure 202 via bypass line 26. Eluant flowing directly to accumulator structure 202 via bypass line 26 can push residual eluate (and gallium-68 contained therein) through accumulator structure 202. This can reduce residual gamma ray emissions emitted from gallium-68 radionuclides produced inside of radioisotope generator 16 and carried to accumulator structure 202 via flowing eluant. In other examples, the technique of FIG. 6 can be performed by terminating elution (e.g., ceasing operation of eluant pump 14) without flushing accumulator structure 202.

After stopping the flow of eluant to accumulator structure 202, controller 36 in the technique of FIG. 6 again receives gamma ray spectroscopy data from detector 34 indicative of the gamma radiation (e.g., magnitude, distribution) detected by detector 34 from radioisotopes present in accumulator structure 202 (308). While germanium-68 does not itself emit in the gamma spectrum, the germanium decays to gallium-68, which emits at the 511 keV line as discussed above. Since the flow of gallium-68 from radioisotope generator 16 has been terminated (and accumulator structure 202 optionally flushed to remove residual gallium-68), gamma radiation emitted by gallium-68 and detected by detector 34 may be attributed as the decay product of germanium-68 captured by accumulator structure 202.

Upon receiving gamma ray spectroscopy data from detector 34, controller 36 may determine an amount of activity associated with germanium-68 by measuring the amount of activity attributable to its decay product gallium-68 (310). To determine the amount of activity associated with germanium-68, controller 36 may identify a region of interest encompassing the 511 keV peak and integrate the area under the peak. Controller 36 can determine from this integration the amount of activity associated with gallium-68 decayed from germanium-68 captured from the eluate by accumulator structure 202.

To determine the activity of germanium-68 in the eluate produced by radioisotope generator 16, controller 36 can convert the measured activity of gallium-68 (310) into a corresponding germanium-68 activity. For example, with reference to data stored in memory, controller 36 can account for the decay rate of germanium-68 to gallium-68, the efficiency of accumulator structure 202 at capturing and binding germanium-68 out of the eluate, and the presence of any gallium-68 attributable to germanium-68 captured during prior elution runs (as adjusted for the decay of such germanium) to convert the measured activity of gallium-68 to an activity of germanium-68 in the eluate produced from radioisotope generator 16.

After determining the activity of gallium-68 and/or germanium-68 in the eluate generated by radioisotope generator 16, system 200 can store and/or use radioisotope activity information in a number of different ways. In one example, controller 36 stores activity data generated during operation of radioisotope generator 16 in a memory associated with the system. The memory may be at the same physical location generator or may be at a physically remote location. The data may allow the operational performance and integrity of system 200, including radioisotope generator 16, to be monitored and evaluated. In some additional examples, controller 36 may actively control system 200 based on radioactivity data determined via detector 34.

For example, controller 36 may compare a measured activity for a particular isotope (e.g., $^{68}$Ge, $^{68}$Ga) or combination of isotopes in eluate generated by system 200 to one or more thresholds stored in memory. The threshold(s) may provide a maximum amount of isotope that can be dosed at any one time. Controller 36 may take a variety of actions when a threshold is exceeded. As one example, controller 36 may initiate a user alert. As another example, controller 36 may control a downstream process from radioisotope generator 16 to prevent eluate generated therefrom from being injected into a patient.

While the example technique of FIG. 6 has been described with respect to a germanium-gallium radioisotope generator, it should be appreciated the configuration of system 200 in FIG. 5 and the technique of FIG. 6 is not limited such an example generator. Such systems and techniques can be implemented using any desired radioisotope generator, including those described herein.

Moreover, while the technique of FIG. 5 has been described in conjunction with operation of radioisotope generator 16, it should be appreciated that the technique is not limited to standalone application but can be implemented in conjunction with other systems and techniques described therein, including those discussed with respect to FIGS. 1-4. For example, prior to executing the technique of FIG. 5, radioisotope generator 16 can be calibrated using a calibration source emitting at or around the 511 keV line, as discussed above with respect to FIG. 4.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a non-transitory computer-readable medium, such as a computer-readable storage medium, containing instructions. Instructions embedded or encoded in a computer-readable storage medium may cause a programmable processor, or other processor, to perform the method, e.g., when the instructions are executed. Non-transitory computer readable storage media may include volatile and/or non-volatile memory forms including, e.g., random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. An elution system comprising:
a radioisotope generator configured to release a daughter radioisotope during elution with an eluant thereby producing an eluate containing the daughter radioisotope, the daughter radioisotope being produced from radioactive decay of a parent radioisotope contained within the radioisotope generator;
an eluate line configured to receive and convey eluate eluted from the radioisotope generator;
an accumulator structure positioned downstream from the radioisotope generator and in fluid communication with the eluate line, the accumulator structure being configured to capture a larger amount of parent radioisotope than daughter radioisotope.

2. The system of claim 1, wherein the radioisotope generator comprises a generator column loaded with the parent radioisotope and the accumulator structure comprises a second column devoid of the parent radioisotope.

3. The system of claim 2, wherein the generator column and the second column are fabricated from a same material.

4. The system of claim 3, wherein the same material from which the generator column and the second column are fabricated is selected from the group consisting of stannic oxide, tin oxide, an organic matrix, and combinations thereof.

5. The system of claim 1, wherein the accumulator structure is configured to capture the larger amount of parent radioisotope than daughter radioisotope by preferentially binding any parent radioisotope present in the eluate received via the eluate line.

6. The system of claim 1, wherein the radioisotope generator comprises one of a $^{99}$Mo/$^{99m}$Tc generator, a $^{68}$Ge/$^{68}$Ga generator, and a $^{82}$Sr/$^{82}$Rb generator.

7. The system of claim 1, wherein the radioisotope generator is a $^{82}$Sr/$^{82}$Rb generator.

8. The system of claim 1, further comprising a base frame with wheels, wherein the radioisotope generator, eluate line, and accumulator structure are mounted on the base frame so as to be movable.

9. The system of claim 1, further comprising an eluant line configured to supply the eluant to the radioisotope generator.

10. The system of claim 1, wherein the accumulator structure is configured to receive eluate from the eluate line so that the eluate flows at least one of through and over the accumulator structure.

* * * * *